(12) United States Patent
Wagener et al.

(10) Patent No.: US 7,267,485 B2
(45) Date of Patent: Sep. 11, 2007

(54) ANNULAR DISK FOR A SLIDING BEARING

(75) Inventors: Keit Wagener, Bissendorf (DE); Thomas Fangmann, Dinklage (DE); Michael Fangmann, Lohne (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 170 days.

(21) Appl. No.: 11/141,822

(22) Filed: Jun. 1, 2005

(65) Prior Publication Data

US 2005/0286821 A1 Dec. 29, 2005

(30) Foreign Application Priority Data

Jun. 28, 2004 (DE) .................. 10 2004 031 302

(51) Int. Cl.
*F16C 17/10* (2006.01)
(52) U.S. Cl. ..................................... 384/125
(58) Field of Classification Search ............... 384/125, 384/140, 482, 215, 275
See application file for complete search history.

(56) References Cited

U.S. PATENT DOCUMENTS

| 3,848,938 A | 11/1974 | Stella et al. |
| 5,263,778 A | 11/1993 | Jordens |
| 5,683,184 A | 11/1997 | Striedacher et al. |

FOREIGN PATENT DOCUMENTS

| DE | G8534101 | 1/1986 |
| DE | 3437247 | 4/1986 |
| DE | 29900907 U1 | 4/1999 |
| DE | 10059759 | 6/2002 |

*Primary Examiner*—Lenard A. Footland
(74) *Attorney, Agent, or Firm*—Christa Hildebrand; Norris McLaughlin & Marcus, PA

(57) ABSTRACT

The invention is directed to an annular disk for sliding bearing, with a first annular element 12 and a seal 23 arranged on the first end face 17 of the first annular element 12. A second annular element is attached to the second end face 19 of the first annual element 12. The two annular elements 12, 13 are made of different materials.

16 Claims, 3 Drawing Sheets

ANNULAR DISK FOR A SLIDING BEARING

BACKGROUND OF THE INVENTION

Figure 1:
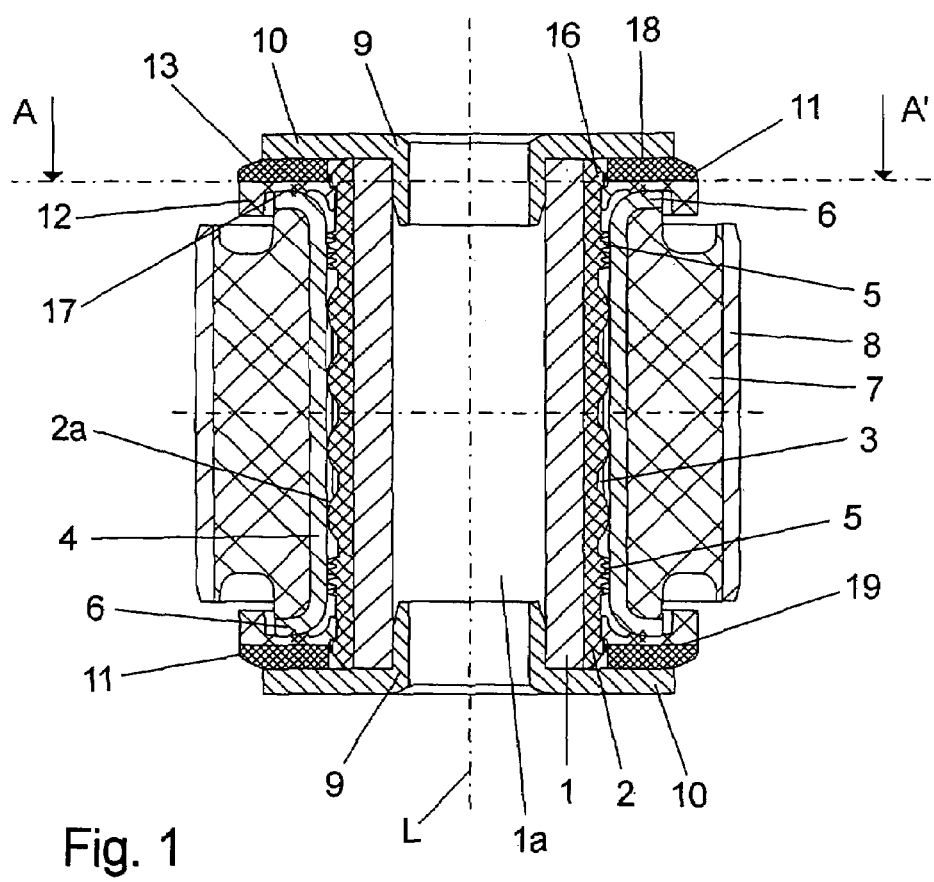

The present invention is directed to an annular disk for a sliding bearing, with a first annual element and a seal arranged on the first end face of the first annular element.

Such annular disks are known in the art. For example, DE 40 36 051 C1 discloses an elastic sliding bearing for a motor vehicle, with an inner bush and a plastic layer surrounding the inner bush, and an edge bead provided on the ends of the inner bush. The plastic layer is surrounded by an outer bush (outer sleeve), whereby a corresponding plastic disk (annular disk) is secured in the axial direction between the edge beads and the outer bush.

When this sliding bearing is installed in a motor vehicle, a vehicle component and the annular disk can come into contact, so that the vehicle component can rotate relative to the annular disk while the motor vehicle is operated, which can cause offending noise. A cap abutting the annular disk can also be fixedly secured on at least one end of the inner bush, allowing the cap to rotate relative to the annular disk and causing objectionable noise. Moreover, a lubricant disposed between the plastic layer and the outer bush can also be flushed out over extended periods of time, for example by salt water.

Based on this conventional design, it is an object of the invention to provide an annular disk for a sliding bearing capable of preventing the generation of objectionable noise.

BRIEF SUMMARY OR THE INVENTION

The object is solved with an annular disk according to claim 1. Preferred embodiments are recited in the dependent claims.

The annular disk according to the invention for a sliding bearing includes a first annular element and a seal arranged on a first end face of the first annular element, wherein a second annular element is secured on the second end face of the first annular element. The two annular element are here made of different materials.

By making the two annular elements of different materials, the second annular element can be fabricated of a material which, when the annular disk is installed, has a large static friction compared to the vehicle component or the cap. Conversely, the second annular element can be fabricated of a material which, when installed, has a very small static friction and sliding friction compared to the outer sleeve of the friction bearing. In this way, the static friction between the annular disk and the motor vehicle component or the cap can be greater than the static or sliding friction between the annular disk and the outer sleeve, allowing the annular disk to rotate relative to the outer sleeve, but not relative to the vehicle component and the cap. Therefore, the annular disk of the invention can produce a sliding bearing which prevents the generation of objectionable noise associated with conventional devices.

The first annular element can occupy approximately ⅔ of the height of the annular disk. Moreover, the seal and the first annular element are preferably fabricated from different materials, so that a material can be selected for the seal that provides a particularly effective sealing action. The sliding bearing can thereby also be protected over extended periods of time by preventing the lubricant to be flushed out of the bearing and/or humidity or contamination from entering the bearing.

When installed, the first end face of the first annular element preferably directly abuts the outer sleeve. The seal also directly abuts the outer sleeve to prevent humidity and contamination from entering the bearing interior and to prevent the lubricant in the sliding bearing from being flushed out. The seal can advantageously be fabricated from the same material as the second annular element and is preferably urged against the outer sleeve with a smaller force than the first annular element. The seal can have an annular shape and can be positioned concentrically with the annular disk and can be shaped, for example, as a sealing lip.

At least one slot that is continuous in the longitudinal direction is provided in the first annular element, with a portion of the second annular element forming the seal extending through the slot. Advantageously, the second annular element and the seal are here formed as a single piece and connected with each other through the slot. The part can therefore be manufactured cost-effectively, because the second annular element and the seal can be manufactured in a single manufacturing step. The edges of the slot can also provide mechanical stability to the seal, preventing bending of the seal, which increases the service life of the seal and contributes to a long-term sealing action. With this embodiment, the two annual elements are also formfittingly affixed to each other in the axial direction.

In particular, the material of the first annual element is harder than the material of the second annual element, so that the first annular element provides overall stability to the annular disk. Moreover, the material of the first annular element can also be harder than the material of the seal.

Advantageously, the first annual element and/or the second annular element and/or the seal are made of plastic, with polyoxymethylene (POM) having emerged as a suitable, in particular dimensionally stable, material for the first annular element. A preferred material for the second annular element and/or the seal is polyurethane (PUR), wherein PUR is generally softer than POM.

For forming a torque-proof connection between the two annular elements, the first annual element can include at least one recess, in which a projection of the second annular element engages.

The invention is also directed to a sliding bearing with an inner element, wherein an outer shoulder is provided on one end of the inner element, and an outer sleeve surrounding the inner element and supported for rotation about the longitudinal axis of the inner element, and at least one annular element according to the invention, which is arranged, in particular affixed, in the direction of the longitudinal axis between the outer shoulder and the outer sleeve. At least the seal of the annular element abuts the outer sleeve, with the annular element implemented according to the aforedescribed embodiments.

In particular, the outer sleeve is surrounded by an elastomeric body, which is in turn surrounded by a receiving sleeve made of metal (e.g., steel or aluminum) or plastic, so that the sliding bearing according to the invention forms an elastic sliding bearing. The inner element can also be formed as a sleeve, through which a vehicle component can extend.

The inner element made of metal (e.g., steel or aluminum) can be surrounded by a sliding layer which is preferably made of plastic with a small static and sliding friction compared to the inner surface of the outer sleeve, which can also be made of metal (e.g., steel or aluminum). The sliding layer is attached to the inner element so as to prevent rotation therebetween and can include lubrication grooves which form reservoirs for a lubricant introduced between the sliding layer and the outer sleeve.

The outer shoulder is preferably secured directly to the inner element. Because the sliding layer and the inner element can form a single unit, the outer shoulder can also be disposed on the sliding layer. In this case, the outer shoulder is only indirectly attached to the inner element.

The outer shoulder can be formed as a single piece with the inner element. Preferably, at least one end of the inner element has a cap, which forms the outer shoulder. In particular, the cap is made of a metal, such as steel, and can frictionally engage with the bore of the inner element, which is preferably implemented as a sleeve, thereby forming a press fit between the inner element and the cap.

Advantageously, the annular disk abuts directly the outer shoulder and the outer sleeve and, in particular, is compressed between the outer shoulder and the outer sleeve, thereby preventing brief contact interruptions between the seal and the outer sleeve.

The material for the first and the second annular element can be selected so that the static friction between the annular disk and the cap is greater than the static or sliding friction between the annular disk and the outer sleeve.

Advantageously, the sliding bearing includes two annular disks according to the invention, wherein a second outer shoulder is provided on the other end of the inner element. The second annular element is arranged, in particular affixed, in the direction of the longitudinal axis between the second outer shoulder and the outer sleeve. The two annular elements can be formed identically, wherein the seal of the second annular element also abuts the outer sleeve. The second outer shoulder can also be formed by a second cap disposed on the second end of the inner element.

The sliding bearing according to the invention is preferably employed in motor vehicles and can be used, for example, to connect an upper transverse suspension arm to the chassis.

BRIEF DESCRIPTION OF THE SEVERAL VIEWS OF THE DRAWING(S)

Figure 2:
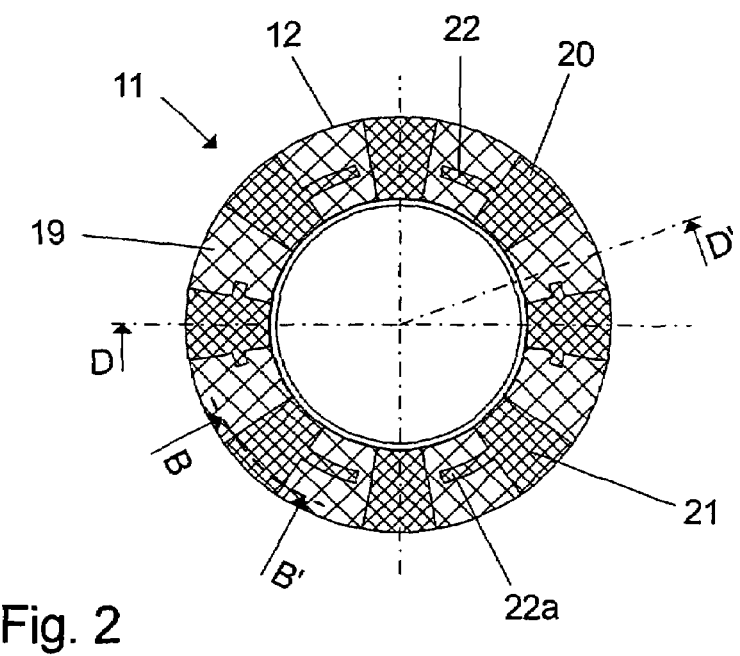
Figure 3:
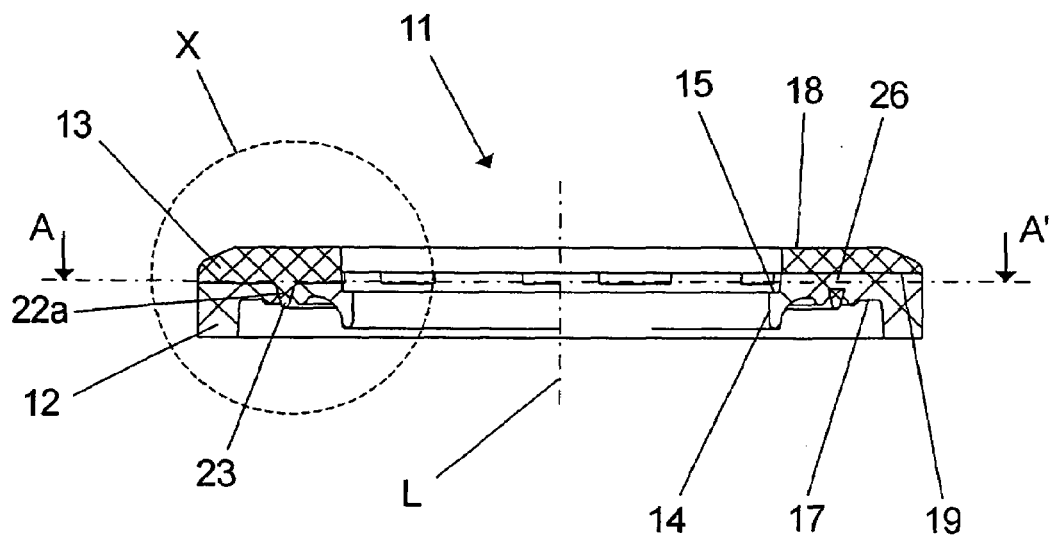
Figure 4:
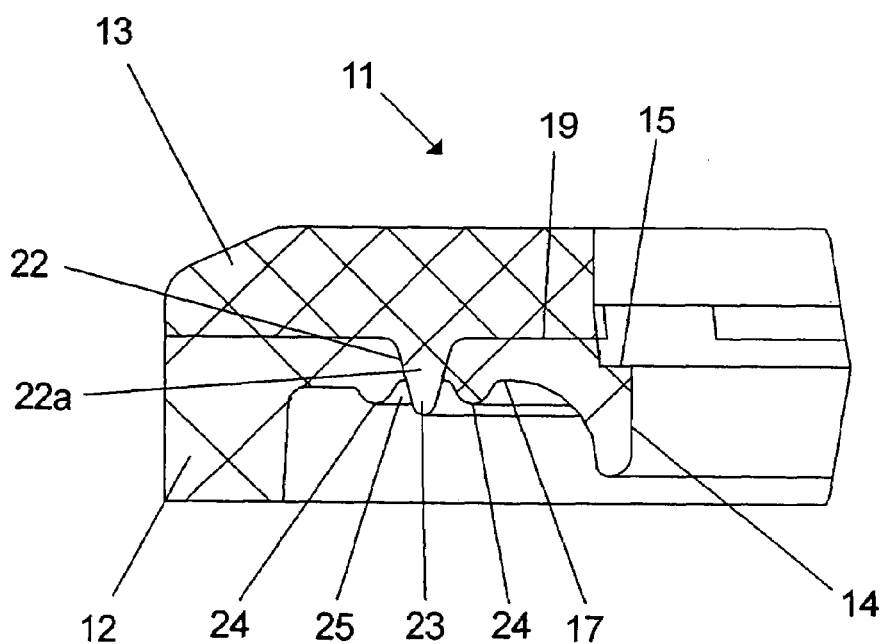
Figure 5:
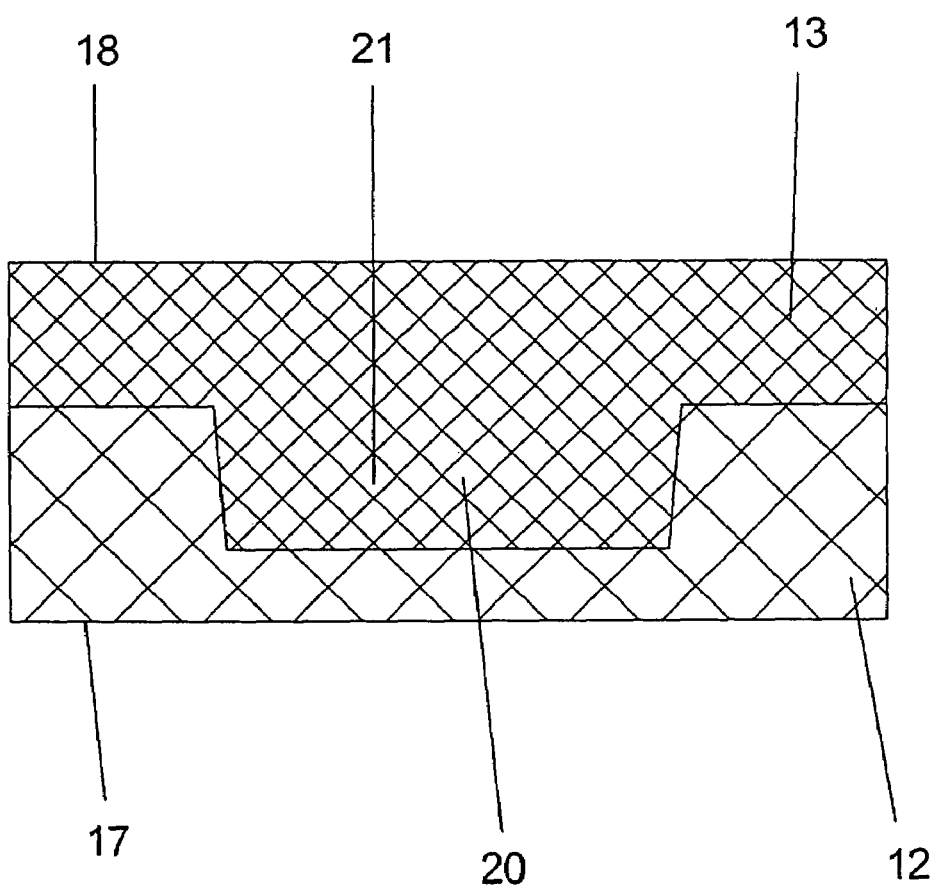

A preferred embodiment of the invention will be described hereinafter with reference to the drawing. The drawing shows in:

FIG. 1 a cross-sectional view of a sliding bearing, in which two annular disks according to an embodiment of the invention are installed, FIG. 2 a cross-sectional view of the upper annular disk depicted in FIG. 1, with the cross-section taken along the line A-A' in FIG. 1, FIG. 3 a cross-sectional view of the upper annular disk depicted in FIG. 1, with the cross-section taken along the line D-D' in FIG. 2, FIG. 4 an enlarged detail of the region in FIG. 3 indicated with an X, and FIG. 5 a cross-sectional view of the upper annular disk depicted in FIG. 1, with the cross-section taken along the line B-B' in FIG. 2.

DETAILED DESCRIPTION OF THE INVENTION

FIG. 1 shows a cross-sectional view of the sliding bearing with an inner sleeve 1, which can be made in particular out of steel, and a plastic sliding layer 2 surrounding the inner sleeve 1. The sliding layer 2 is attached to the inner sleeve 1 by a torque-proof connection. The outer surface 2a of the sliding layer 2 includes lubrication grooves 3, which are filled with a lubricant (not shown). The sliding layer 2 is surrounded by an outer sleeve 4 which can be made, in particular, of aluminum. The outer sleeve 4 abuts the sliding layer 2 via the interposed lubricant and is able to rotate about the longitudinal axis L of the bearing relative to the sliding layer and the inner sleeve 1. Moreover, annular sealing elements 5 are formed on the sliding layer, between which the lubrication grooves 3 are arranged in the longitudinal direction L.

The ends of the outer sleeve 4 include radially outwardly oriented angled sections 6. An elastomeric body 7, which in turn is surrounded by a receiving sleeve 8 made preferably of aluminum, surrounds the outer sleeve 4 between the two ends. The outer sleeve 4 and the receiving sleeve 8 are connected by the elastomeric body 7 so as to prevent rotation therebetween, for example through vulcanization.

A corresponding cap 9, in particular a cap made of steel, is secured on each end of the inner sleeve 1. The cap 9 engages with the through bore 1a of the inner sleeve 1 and is connected with the inner sleeve 1 via a press fit in a torque-proof manner. Each cap 9 extends radially outwardly with, in particular, an annular outer shoulder 10, wherein a corresponding annular disk 11 according to an embodiment of the invention is arranged between the outer shoulders 10 and the angled sections 6 of the outer sleeve 2. The two annular disks 11 are formed identically and are each composed of a first annular element 12 and a second annular element 13. For affixing the annular disks 11, in particular during installation, an inner shoulder 15 (FIG. 3) is provided on the inner surface 14 (FIG. 3) of the first annular element 12, which abuts a radially outwardly oriented projection 16 formed on the sliding layer 2. The respective end faces 17 of the annular disks 11 facing the outer sleeve 4 abut of the angled sections 6 of the outer sleeve 4, whereas the second end face 18 of each annular disk 11 abuts the corresponding outer shoulder 10. Each annular disk 11 is here compressed between the corresponding outer shoulder 10 and the outer sleeve 2.

The inner sleeve 1, the sliding layer 2, the outer sleeve 4, the receiving sleeve 8, and the annular disks 11 are arranged concentrically with respect to each other, so that their longitudinal axes coincide with the longitudinal axis L of the bearing.

In particular, the first annular element 12 is made from the relatively hard and dimensionally stable plastic material "POM", which has a particularly low static and sliding friction compared to the outer sleeve 4, which is preferably made from aluminum. Conversely, the second annual element 13 is made from the plastic material "PUR", which has a relatively high static friction compared to the cap 9 which is preferably made from steel. Because the first annular element 12 is made from a harder material than the second annual element 13, the first annular element 12 provides overall mechanical stability to the annular disk 11. Moreover, the relatively high static friction between the second annular element 13 and the cap 9 and the relatively low static and sliding friction between the first annular element 12 and the outer sleeve 4 prevent the annular disks 11 from rotating when the outer sleeve 4 rotates relative to the inner sleeve 1. Instead, the two-component design of the annular disks 11 allows the first end face 17 to slide relative to the outer sleeve 4.

FIG. 2 shows a top view of the upper annular disk 11 depicted in FIG. 1, with the cross-section taken along the line A-A' of FIG. 1. The end face 19 of the first annular element 12 facing the second annular element 13 includes several recesses 20, in which projections 21 of the second annular element 13 engage. The first annular element 12 also includes several continuous slots 22 extending in the longitudinal direction L, with projections 22a of the second annular element 13 extending through the slots 22. All the slots 22 are located spaced from each other on a circle which is concentric with longitudinal axis L.

FIG. 3 shows a cross-sectional view of the upper annular disk 11 taken along the line D-D' depicted in FIG. 2. The projections 22a of the second annular element 13 extending through the slots 22 form a continuous annular sealing lip 23 on the end face 17 of the annular disk 11, which abuts the angled sections 6 of the outer sleeve 4 after installation of the annular disk 11 and forms an additional seal, which can over extended periods of time prevent moisture and contamination from entering the bearing and lubricant from exiting the bearing. A region 26 is disposed on the first annular element 12 between two adjacent slots 22 and arranged between the second annular element 13 and the sealing lip 23, which is formed in one-piece with the annular element 13, whereby the two annular elements 12, 13 are axially in formfitting engagement with each other.

FIG. 4 shows an enlarged view of the section of FIG. 3 indicated with an "X", which shows more clearly that the sealing lip 23 is arranged between two, preferably annular, axial projections 24 disposed on the end face 17 of the annular disk 11. After installation of the annular disk 11, the two projections 24 and the sealing lip 23 abut the angled sections 6 of the outer sleeve 4, wherein the space 25 formed between the projections 24 is wider than the sealing lip 23. Conversely, the sealing lip 23 and the projection 22a, respectively, directly abut the edges of the slots 22 in the region above the space 25. The width of the slots 22 decreases with increasing distance from the end face 19, until the slots 22 merge into the wider space 25.

FIG. 5 shows a cross-sectional view of the upper annular disk 11 taken along the line B-B' depicted in FIG. 2. The recesses 20 provided in the first annular element 12 have a slightly trapezoidal cross-section, so that the likewise slightly trapezoidal projections 21 of the second annular element 13 can easily be inserted in the recesses 20. The recesses 20 and the projections 21, in addition to the slots 22, form a form-fitting, torque-proof connection between the two annular elements 12, 13.

The annular disk 11 can be fabricated by inserting the produced first annular element 12 in a mold and subsequently molding the second annular element 13 by an injection process onto the first annular element 12. The material of the second annular element 13 is thereby molded in the recesses 20 and penetrates the slots 22 to form the continuous annular sealing lip 23.

The invention claimed is:

1. An annular disk for a sliding bearing, comprising
a first annular element and a seal arranged on a first end face of the first annular element,
a second annular element secured on the second end face of the first annular element,
wherein the first and the second annular elements are made of different materials,
wherein at least one slot that is continuous in the longitudinal direction L, is provided in the first annular element, and
wherein a projection of the second annular element formed as one-piece with the seal extends through the slot.

2. The annular disk according to claim 1,
wherein the second annular element and the seal are made of the same material.

3. The annular disk according to claim 1,
wherein the first annual element includes at least one recess, in which a projection of the second annular element engages.

4. The annular disk according to claim 1,
wherein the seal has an annular shape and is arranged concentrically in relation to the annular disk.

5. The annular disk according to claims 1,
wherein the seal is formed as a sealing lip.

6. The annular disk according to claim 1,
wherein the material of the first annular element has a greater Shore hardness than the material of the second annular element.

7. The annular disk according to claim 1,
wherein the material of the first annular element has a greater Shore hardness than the material of the seal.

8. The annular disk according to claim 1,
wherein the first annual element and/or the second annular element and/or the seal are made of plastic.

9. The annular disk according to claim 1,
wherein the first annual element is made of polyoxymethylene.

10. The annular disk according to claim 1,
wherein the second annular element and/or the seal are made of polyurethane.

11. An annular disk for a sliding bearing, with a first annular element and a seal arranged on a first end face of the first annular element,
wherein a second annular element is secured on the second end face of the first annular element,
wherein the two annular elements are made of different materials,
wherein the sliding bearing includes an inner element, with an outer shoulder provided on one end of the inner element, and an outer sleeve surrounding the inner element and supported for rotation about the longitudinal axis (L) of the inner element,
wherein the annular element is arranged in the direction of the longitudinal axis (L) between the outer shoulder and the outer sleeve, and wherein the seal of the annular element abuts the outer sleeve.

12. The sliding bearing according to claim 11,
wherein the other end of the inner element is provided with a second outer shoulder, that a second annular element is arranged in the direction of the longitudinal axis (L) between the second outer shoulder and the outer sleeve, wherein the two annular elements are formed identically and the seal of the second annular element abuts the outer sleeve.

13. The sliding bearing according to claim 11,
wherein the outer sleeve is surrounded by an elastomeric body, which in turn is surrounded by a receiving sleeve.

14. The sliding bearing according to claim 11,
wherein the inner element is formed as a sleeve.

15. The sliding bearing according to one of the claims 11,
wherein the inner element includes a sliding layer surrounding the inner element.

16. The sliding bearing according to claim 11,
wherein at least one end of the inner element includes a cap forming the outer shoulder.

* * * * *

UNITED STATES PATENT AND TRADEMARK OFFICE
CERTIFICATE OF CORRECTION

PATENT NO. : 7,267,485 B2  Page 1 of 1
APPLICATION NO. : 11/141822
DATED : September 11, 2007
INVENTOR(S) : Wagener et al.

It is certified that error appears in the above-identified patent and that said Letters Patent is hereby corrected as shown below:

Column 1, Line 31, "BRIEF SUMMARY OR THE INVENTION" should read --BRIEF SUMMARY OF THE INVENTION--

Signed and Sealed this

Twenty-fifth Day of December, 2007

JON W. DUDAS
*Director of the United States Patent and Trademark Office*